United States Patent [19]
Lannert et al.

[11] 3,855,248
[45] Dec. 17, 1974

[54] DIOXOLANE POLYCARBOXYLATES

[75] Inventors: Kent P. Lannert, Freeburg, Ill.;
Russel D. Harken, St. Louis, Mo.

[73] Assignee: Monsanto Company, St. Louis, Mo.

[22] Filed: May 8, 1972

[21] Appl. No.: 251,160

[52] U.S. Cl.................. 260/340.9, 252/89, 252/541,
252/546
[51] Int. Cl............................................. C07d 13/04
[58] Field of Search.................................. 260/340.9

[56] References Cited
UNITED STATES PATENTS
3,369,966  2/1968  Chang............................. 260/340.9
3,560,569  2/1971  Hurd................................ 260/340.9

OTHER PUBLICATIONS
Morrison et al., "Organic Chemistry," 2nd Ed., 1966, Allyn and Bacon, Inc., Boston, pp. 683–686.

Primary Examiner—Donald G. Daus
Assistant Examiner—James H. Turnipseed
Attorney, Agent, or Firm—Thomas N. Wallin; J. E. Maurer; N. E. Willis

[57] ABSTRACT

Compounds having the formula

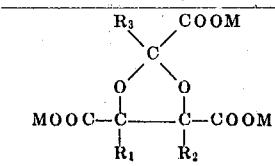

wherein $R_1$ and $R_2$ are hydrogen, methyl, —COOM or —CH$_2$COOM; $R_3$ is hydrogen, methyl or COOM; and M is alkali metal or ammonium are useful sequestrants and detergency builders. The lower alkyl ester and acid forms of such compounds are useful intermediates for their production.

4 Claims, No Drawings

DIOXOLANE POLYCARBOXYLATES

BACKGROUND OF THE INVENTION

This invention relates to novel compounds and precursors thereof useful as sequestrants and detergency builders and to methods of making such compounds.

Numerous materials are known which, by virtue of sequestering characteristics and/or capability to enhance the cleansing ability of detergent formulations in combination with various surfactants are useful in water treating applications, or as adjuvants, reenforcers, supplements, augmentors, potentiators and/or benefactors in detergent formulations wherein such materials are usually referred to as detergency builders.

Many materials of the foregoing type are characterized by high phosphorous content such as the alkali metal tripolyphosphates widely employed as detergency builders. It has recently been suggested by some researchers that such compounds may contribute to the acceleration of eutrophication processes and, particularly in the detergent builder field, extensive efforts have been exerted to provide alternate functional compounds free of phosphorus. In view of this, the provision of compounds containing little or no phosphorus which exhibit sequestration and/or builder function is recognized as an advance in the art.

SUMMARY OF THE INVENTION

It is an object of this invention to provide novel compounds and intermediates useful for the production of such compounds which are useful as sequestrants and as detergency builders, and to provide methods of manufacture of such compounds. A further object of the invention is to provide novel detergent formulations containing such compounds as detergency builders.

The novel compounds of this invention and their manufacture and utility will be understood from the following description of the preferred embodiments.

DESCRIPTION OF THE PREFERRED EMBODIMENTS

The novel compounds of this invention are represented by the formula

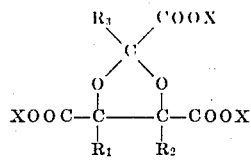

wherein $R_1$ and $R_2$ are hydrogen, methyl, $-COOX$, or $CH_2COOX$; $R_3$ is hydrogen, methyl or COOX; and X is hydrogen (acid form of compounds), methyl or ethyl (ester forms) or alkali metal or ammonium (salt forms).

The ester forms of such compounds are prepared by reacting one mole of a vicinal dihydroxy alkyl carboxylate represented by the formula

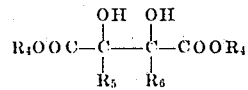

wherein $R_4$ is methyl or ethyl and $R_5$ and $R_6$ are hydrogen, methyl, $-COOR_4$ or $CH_2COOR_4$ with one-half mole dihalogen compound represented by the formula $R_7-CZ_2COOR_8$ wherein $R_7$ is hydrogen, methyl, or $-COOR_4$, Z is chlorine or bromine and $R_8$ is methyl, ethyl or alkali metal provided that when $R_7$ is hydrogen, $R_8$ is alkali metal.

Examples of suitable dihydroxy alkyl carboxylates include the di, tri and tetra ethyl or methyl carboxylates of 1,2-dihydroxyethane, 1,2-dihydroxypropane, or 2,3-dihydroxybutane. Compounds of this type, when not commercially available, can be conveniently prepared from corresponding aliphatic polycarboxylates by (1) halogenation with chlorine or bromine, (2) dehydrohalogenation with a strong base and (3) oxidation with aqueous hydrogen peroxide. Such procedures are described by Morrison and Boyd, *Organic Chemistry*, 2nd Edition, (Allyn and Bacon, Inc., Boston, 1966) pp 604–609, 966, 876–878, incorporated herein by reference. It is further noted that the dihydroxy compounds exist in either or both meso and optically active forms. The use of optically active forms yields a product having "trans" configuration whereas the meso form yields a product of "cis" configuration. Products of cis configuration are preferred as being more readily biodegradable.

Examples of suitable dihalogen compounds include sodium dichloro or dibromo acetate; methyl or ethyl sodium dichloropropionate; dimethyl or diethyl dibromo or dichloro malonate and the like.

The reaction is conducted in an anhydrous, non-protonic, organic liquid such as 1,2-dimethoxyethane, diethyl ether, tetrahydrofuran, dioxane, N,N-dimethyl formamide, toluene or the like in the presence of sufficient sodium hydride, sodium, potassium, etc. to ionize the hydroxy groups of the dihydroxy alkyl carboxylates.

The reaction medium will contain from 5 to 30 parts by weight non-protonic liquid per part by weight of the reactants.

The reaction can be conducted at a temperature of from 0° – 50°C, preferably 20° – 40°C.

In a preferred embodiment of the reaction, 1 part by weight of the dihydroxy compound is dissolved in up to 5 parts by weight of the non-protonic liquid and added to 2 parts of the base slurried in 5 – 20 parts non-protonic liquid at 20° – 40°C. The organo halogen compound is similarly dissolved and added to the reaction medium. The mixture is maintained at the desired reaction temperature for 4 to 48 hours, preferably 8 to 16 hours and the ester product isolated by filtration to separate alkali metal halides and by evaporation of the non-protonic liquid. The use of a dihalo compound wherein $R_8$ is alkali metal will yield an ester salt product which can be acidified, esterified and recovered as described.

The ester product is converted to the corresponding alkali metal or ammonium salt by conventional saponification techniques in aqueous or aqueous/alcohol media. The salt can be isolated by concentration and crystallization or precipitation with ethanol, methanol or acetone. The salt can be converted to the acid form by acidification according to conventional techniques.

Both the acid and salt forms of the compounds of this invention are useful as metal ion sequestrants and as detergency builders, the use of the salt form being preferred.

The detergent formulations utilizing the compounds of this invention will contain from 1 to 75 percent by weight, preferably from 5 to 50 percent by weight of the salt, preferably sodium salt forms of the compounds of this invention. Such compounds can be utilized as the sole detergency builder in the compositions or in combination with other known detergency builders such as water soluble inorganic builder salts, for example, alkali metal carbonates, borates, phosphates, polyphosphates, bicarbonates and silicates or organic builders such as salts of phytic acid, sodium citrate, water soluble polymeric polycarboxylates as described in U.S. Pat. No. 3,308,067 and the like.

The detergent formulations will additionally contain at least 8 percent by weight of a surfactant. Any of the numerous well-known anionic, nonionic, zwitterionic or ampholytic surfactants can be employed.

Examples of suitable anionic surfactants include alkyl ethyl sulfonates, alkyl sulfates, acyl sarcosinates; acyl esters of isocyanates, acyl N-methyl taurides, and alkyl aryl sulfonates. The foregoing materials are used in the form of their water-soluble sodium, potassium, ammonium and alkyl ammonium salts. Specific examples include sodium laryl sulfate; sodium N-methyl aluryll tauride; sodium dodecyl benzene sulfonate; and triethanol amine undecanol benzene sulfonate.

Examples of suitable nonionic detergents include alkyl phenol and alcohol alkoxylates including condensates of 1-decanol or 1-undecanol with from 3 to 5 molecular proportions of ethylene oxide such as described in U.S. patent application Ser. No. 707,480 filed Feb. 23, 1968 and copending herewith; condensates of monohydroxy or polyhydroxy alcohols such as oleyl alcohol or 1-tridecanol with from 9 to 15 molecular proportions of ethylene oxides; alkyl internal vicinal dialkoxy or hydroxy alkoxy compounds as described in U.S. patent application Ser. No. 852,898 filed Aug. 25, 1969 and copending herewith; and condensates of alkylene oxides with organo amines, for example, ethylene diamine and amides such as N-octadecyl diethanol amide.

Examples of cationic surfactants include octadecyl ammonium chloride; straight chain fatty amines having eight to 18 carbon atoms; and quaternary ammonium compounds such as octadecyl trimethyl ammonium chloride.

Suitable ampholitic surfactants include the amido alkene sulfonates such as sodium C-pentadecyl, N-methyl amido ethyl sulfonate potassium C-octyl N-naphthalene amido propyl sulfonate; ammonium C-decyl, N-cyclo propyl amido butyl sulfonate, and aliphatic amine derivatives in which the aliphatic substituent contains an anionic water-solubilizing substituent such as a carboxy, sulfo, phosphato, or phosphino group, for example, sodium-3-dodecyl amino propionate and sodium-3-dodecyl amino propane sulfonate.

Examples of zwitterionic surfactants include derivatives of quaternary ammonium phosphonium and sulfonium compounds such as 3-(N,N-dimethyl-N-hexadecyl ammonio) propane-1-sulfonate and 3-(N,N-dimethyl-N-hexadecyl ammonio-2-hydroxy propane-1-sulfonate).

It will be understood that the above examples of supplementary surfactants are by no means comprehensive. Numerous other surfactants are known to those skilled in the art and are set forth in such familiar references as *Surface Active Agents* by A. M. Schwartz and James W. Perry. It will be further understood that the use of such surfactants will be in accordance with conventional, well-understood practices of detergent formulation. For example, cationic and anionic detergents will not normally be employed in combination due to recognized problems of precipitation of insoluble products.

In accordance with general practice, the ratio of the detergency building components to the surfactant components will be in the range of from 1:2 to about 12:1 by weight.

In addition to surfactant and builder components, the detergent formulations may contain fillers such as sodium sulfate and minor amounts of bleaches, dyes, optical brighteners, soil anti-redeposition agents, perfumes and similar conventional detergent formulation additives.

In the interest of conciseness, the invention will be exemplified by the preparation of tetrasodium 1,3-dioxolane-2,2,4,5-tetracarboxylate and the acid and ester forms thereof, and the properties of this material and compositions containing the same. It will be understood that analogous procedures can be employed for production of other compounds of this invention which are characterized by similar properties. In the examples, all parts and percentages are by weight unless otherwise indicated.

EXAMPLE I

Twenty-one parts diethyl-1,2-dihydroxyethane-1,2-dicarboxylate are dissolved in 100 parts 1,2-dimethoxyethane and added to a slurry of 10 parts sodium hydride in 150 parts 1,2-dimethoxy ethane at a temperature of 30°C. To this mixture is added 32 parts diethyl bromomalonate in 160 parts 1,2-dimethoxyethane. The mixture is maintained at 80°C for 10 hours. The ester product is isolated by filtration and evaporation of the 1,2-dimethoxyethane. The ester is converted to tetrasodium 1,3-dioxolane-2,2,4,5-tetracarboxylate by saponification in aqueous sodium hydroxide, concentrated, and precipated by addition of acetone. Acidulation of the salt with sulfuric acid yields the corresponding acid.

EXAMPLE II

The salt and acid produced according to Example I are tested for sequestration characteristics and are found to effectively sequester $Ca^{++}$ ions.

EXAMPLE III

Detergent formulations containing 12 percent linear alkyl-benzene sulfonate having an average alkyl chain length of about 12 carbon atoms; from 5 to 75 percent tetrasodium 1,3-dioxolane-2,2,4,5-tetracarboxylate; 12 percent sodium silicate having an $SiO_2$ to $Na_2O$ ratio of about 2:4; and a quantity of sodium sulfate sufficient to equal 100 percent are found, in conventional laundry operations, to clean soiled fabric samples substantially better than otherwise identical formulations containing no tetrasodium 1,3-dioxolane-2,2,4,5-tetracarboxylate. These tests demonstrate that this compound is an effective detergency builder.

EXAMPLE IV

The tests of Example III above are repeated using a detergent formulation in which Neodole 45–11 (a nonionic surfactant which is an aduct of a modified oxo type $C_{14}$–$C_{15}$ alcohol with an average of 11 moles of ethylene oxide is substituted for the alkylbenzene sulfonate. Comparable results are obtained.

EXAMPLE V

The tests of Example III are repeated with a detergent formulation wherein sodium hydroxyalkyl ($C_{14}$–$C_{16}$ alkyl chain length) N-methyl taurate, an ampholytic surfactant, is substituted for the alkylbenzene sulfonate. Comparable results are obtained.

EXAMPLE VI

The tests of Example III are repeated with a detergent formulation wherein cocodimethylsulfopropylbetaine, a zwitter-ionic surfactant is substituted for the alkylbenzene sulfonate. Comparable results are obtained.

What is claimed is:
1. A compound represented by the formula

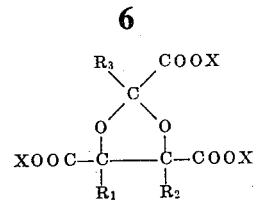

wherein $R_1$ and $R_2$ are selected from the group consisting of hydrogen, methyl, —COOX, and —CH$_2$COOX; $R_3$ is selected from the group consisting of hydrogen, methyl and —COOX; and X is selected from the group consisting of hydrogen, methyl, ethyl, alkali metal, and ammonium.

2. A compound according to claim 1 characterized by cis configuration.

3. Tetrasodium 1,3-dioxolane-2,2,4,5-tetracarboxylate.

4. The compound of claim 3 characterized by cis configuration.

* * * * *